(12) United States Patent
Muir

(10) Patent No.: US 7,089,126 B2
(45) Date of Patent: Aug. 8, 2006

(54) DIODE DISCOVERY POWER LEVEL DETECTION

(75) Inventor: Robert Muir, East Kilbride (GB)

(73) Assignee: Intel Corporation, Santa Clara, CA (US)

(*) Notice: Subject to any disclaimer, the term of this patent is extended or adjusted under 35 U.S.C. 154(b) by 691 days.

(21) Appl. No.: 09/992,554

(22) Filed: Nov. 6, 2001

(65) Prior Publication Data

US 2003/0087670 A1    May 8, 2003

(51) Int. Cl.
*G01R 21/00* (2006.01)

(52) U.S. Cl. ............................ 702/60; 702/57; 702/188

(58) Field of Classification Search ................. 702/57, 702/60, 117, 188; 375/316, 295; 327/427; 714/815
See application file for complete search history.

(56) References Cited

U.S. PATENT DOCUMENTS

| | | | |
|---|---|---|---|
| 3,774,206 A * | 11/1973 | Rauch ......................... | 342/89 |
| 4,839,650 A * | 6/1989 | Geen et al. ................. | 341/118 |
| 5,992,553 A * | 11/1999 | Morrison ..................... | 180/206 |
| 6,377,028 B1 * | 4/2002 | Armstrong et al. ......... | 320/136 |
| 6,618,673 B1 * | 9/2003 | Zur ............................... | 702/2 |
| 2003/0014658 A1 * | 1/2003 | Walker et al. .............. | 713/200 |
| 2004/0170428 A1 * | 9/2004 | Barker et al. ................ | 398/33 |

* cited by examiner

*Primary Examiner*—Marc S. Hoff
*Assistant Examiner*—Janet L Suglo
(74) *Attorney, Agent, or Firm*—Fish & Richardson P.C.

(57) ABSTRACT

A method for discovering a power level in a diode discovery circuit includes transmiting a pulse signal from a diode discovery device on a first line, receiving the pulse signal in the diode discovery device on a second line, measuring a time to charge a capacitor in response to applying power to determine the power level, and applying power in response to comparing the transmitted pulse signal to the received pulse signal and to measuring the time.

17 Claims, 5 Drawing Sheets

DIODE DISCOVERY POWER LEVEL DETECTION

TECHNICAL FIELD

This invention relates to diode discovery power level detection.

BACKGROUND

A basis for power requirement across a Medium Dependent Interface (MDI) link is to enable a new class of devices that would otherwise not be economically viable or consumer desirable. Such devices include, but are not limited to, Web Cams, Smart card readers, Industrial control functions, Building infrastructure control, Internet Protocol (IP) phones, Personal organizers and Wireless LAN Access nodes. All of these devices require power supplies in their respective deployment zones. For example, a Wireless Local Area Network (LAN) node would typically be installed on a wall in an office. It would be unlikely to have a power socket at a height of 6 feet on an office wall. However if power is supplied via the MDI link then only one low voltage cable carrying both power and data to the node need be run back to an Enterprise LAN.

DESCRIPTION OF DRAWINGS

Like reference symbols in the various drawings indicate like elements.

DETAILED DESCRIPTION

Figure 1:
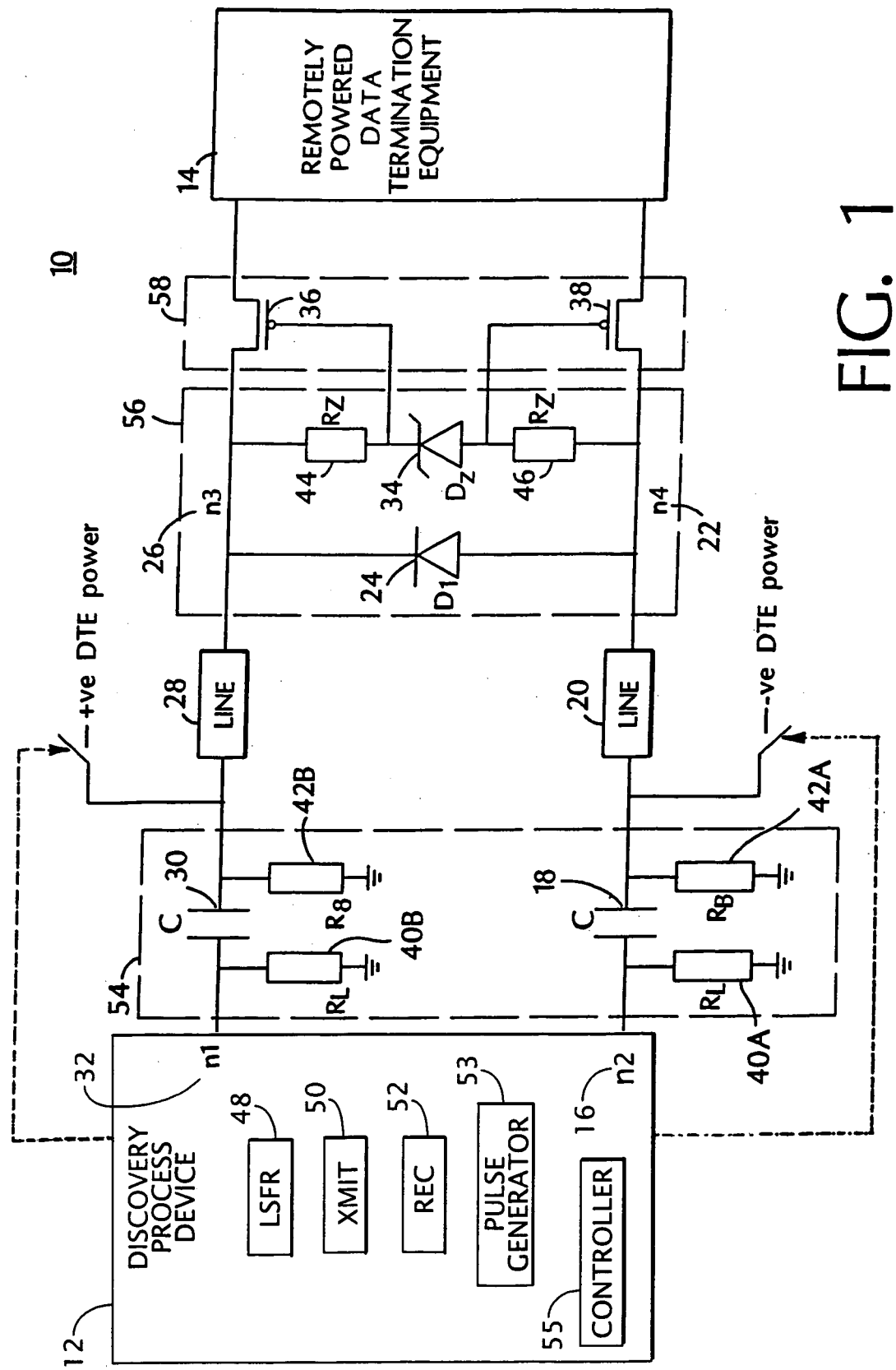
FIG. 1 is a diode discovery process circuit.

Referring to FIG. 1, a diode discovery process circuit 10 is shown. The circuit 10 is used for device detection. A goal of a discovery process device 12 is to determine the powering requirements of a remotely powered Data Terminal Equipment (DTE) device 14 and then instruct a power supply to apply power. During a discovery process the DTE device 14 will not have power since it requires power through a line 20 or 28. Therefore, any circuit that resides by the DTE device 14 for the discovery process should be passive. The diode discovery device 12 is a controller that includes a linear feedback shift register (LFSR) 48, a transmit register 50 and a receive register 52, as described below. The device 12 includes a pulse generator 53 and a controller 55 (or processor) to perform compare and control operations described below.

The circuit 10 uses the conductance characteristics of a diode. The device 12 attempts to send a positive and negative voltage pulse through a diode. One of the attempts will be successful since the diode will turn on and conduct whereas the other attempt will fail since the diode will be reversed biased and will not conduct. The discovery process device 12 is used to both send and receive pulses and thus knows when it should and should not receive pulses. If a line 20,28 is not correctly terminated in a diode, the device 12 can detect the incorrect termination. A short circuit will pass both polarities of pulses while an open circuit will pass no pulses. As configured, a positive pulse from node n2 16 of the discovery process device 12 will pass through the capacitor 18 and line 20 to n4 22. A diode D1 24 will become forward biased and pass the pulse to n3 26. The pulse will continue on through the other line 28 and capacitor 30 to node n1 32 where it will be detected by the discovery process device 12. On the other hand, a positive pulse from node n1 32 will be blocked at the diode 24.

If a test is passed then power will be applied to the line 28. A potential difference across n3 26 and n4 22 will rise until the Zener diode DZ 34 breaks down allowing two isolation Metal-Oxide-Semiconductor Field Effect Transistors (MOSFETs) 36 and 38 to switch on and pass power to the DTE 14. During the discovery process the MOSFETs 36 and 38 are off to isolate the discovery diode 24 from the DTE 14.

A DTE power supply may go up to 60 volts so the discovery process device 12 is DC isolated from the supply to prevent the device 12 from being damaged by the capacitors 18 and 30.

The device 12 is coupled to load resistors 40A and 40B that have a high resistance to maximize the signal to be detected at node n2 16 but is small enough to sink sufficient current to pull down node n2 16 and minimize the effect of any induced signals. A preferred value of 3.3 k ohms is chosen.

The device 12 is also coupled to bleed resistors 42A, 42B that prevent charge build up on the isolated lines 20, 28. The value of the bleed resistor should be high to minimize the power dissipation from the DTE power supply. Values in a range of several thousand ohms to tens or hundreds of thousand ohms are used for the resistor. One value is 47 k, which is chosen to give a total power dissipation of 77 mW at 60V. The relationship between the DTE power supplies and the discovery process device 12 ground determines how this power is split between the two resistors 40A and 42A for node 16 and 40B and 42B for node 32. Resistors 40A, 42A and capacitor 18 are coupled in a $\pi$ network between node 16 and line 20. A similar arrangement is provided for the other node 32 and line 28 with resistors 40B, 42B and capacitor 30. Capacitor 18 and resistors 40A and 42A are part of the drive line while capacitor 30 and resistors 40B and 42B are part of the receiver line. Combined, they are referred to as a driver/receiver region 54 of circuit 10.

Diode D1 24 has a low capacitance value (less than 0.1 nF, for example) to prevent the reverse pulse from being coupled through. It also preferred to have a reverse breakdown voltage greater than 60 volts.

Diode DZ 34 is used to detect when the power supply has applied power and so a device with a breakdown voltage of approximately 8 volts is preferred. Below 8 volts the MOSFETs 36 and 38 are shut off while above 8 volts they switch on.

The two resistors 44 and 46 are present to dissipate little power when the power supply is applied. A value of 50 k is preferred, which gives a power dissipation of 36 mW at 60V.

The MOSFETs 36 and 38 are able to pass 350 mA with a small (<0.5 volt) drop and to withstand approximately 30 volts from gate to source/drain.

Diodes 24 and 34, and resistors 44 and 46 make up a diode detector region 56 of circuit 10. FETs 36 and 38 make up a FET device region 58 of the circuit 10.

Figure 2:
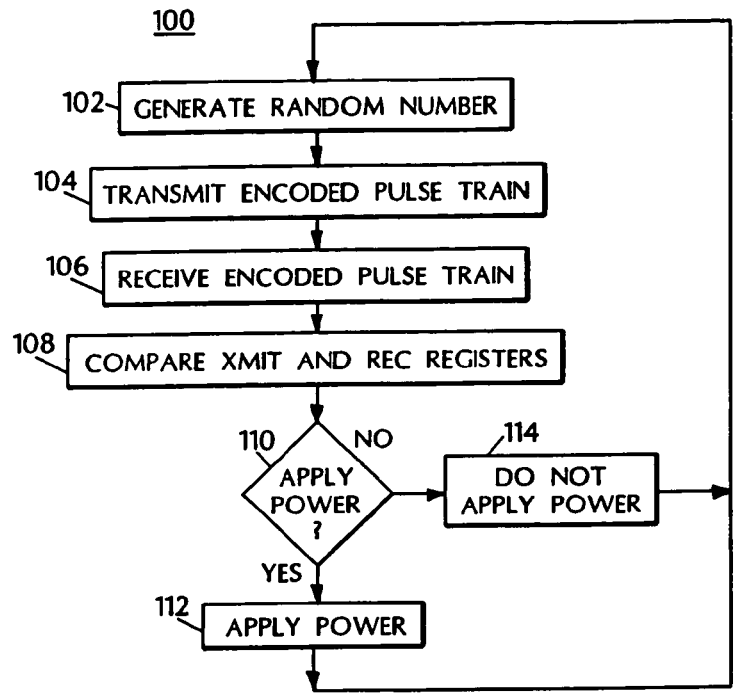
FIG. 2 shows a diode discovery process for determining a type of DTE device that is present on an MDI link.

Referring to FIG. 2, a process 100 for determining a type of DTE device that is present on an MDI link is shown. The process 100 generates (102) a pseudo random 11-bit word encoded as a pulse train. The process 100 sends a different word each time it is transmitted. The direction of the pulse train is changed each alternate transmit cycle and the process 100 is repeated three times. The pseudo number is a generated side stream scrambler and provides a periodic sequence of 2047 bits generated by the recursive linear function $X(n)=X[n-11]+X[n-9]$ (modulo 2). Each port n1 32 and n2 16 is seeded differently based on the port number; this avoids issues of two power capable sources successfully negotiating with each other to apply power.

The process 100 transmits (104) the encoded pulse train and receives (106) the encoded pulse train. When required to transmit, the 11 bit contents of a linear feedback shift register (LFSR) 48 are captured as a digital word in a transmit register 50, and this digital word is sent to the pulse generator output. The LFSR 48 is a counter that is very fast and requires few resources. The LFSR 48 counts in pseudorandom sequence that repeats after $2^{n-1}$ cycles. At each step, the bits simply shift left one bit, and into the low bit is shifted some XOR or XNOR combination of previous bits.

The transmission order is least significant bit (LSB) first. If the corresponding bit in the source word is a logic "1" it sends a pulse, if a logic "0" no pulse is sent. The source word is stored for comparison with the received word.

The receiver is looking for the required response only during the second half of the transmitted pulse time. The receiver input over samples this line and makes a determination of the line state. This state is stored in a receive register 52 until all 11 bits have been sampled. The process compares (108) the contents of the receive register 52 and transmit register 50 and determines (110) whether to apply power.

As stated above, the transmit, receive and compare sequence is performed a total of six times with the polarity being altered each time. If a DTE device requiring power on the MDI link is discovered then there will be three occasions where a direct match occurs and three occasions where the result was ZERO. A ZERO result is received when the diode is reversed biased because no transmitted pulses are able to pass. The order of these results alternate but could start with either a match or a Zero result. This allows the polarity of the DTE detection diode to be determined and as a result crossover cables can now be dealt with, without the need to specify a fixed polarity for the cable pairs. Under these conditions the process 100 applies (112) power; otherwise, the process 100 applies no power (114).

The duration of process 100 is as follows. The total time taken for a single transmit, receive and compare sequence is equal to:

11×Pulse and Discharge times=11×2 milliseconds=22 milliseconds

The above sequence is repeated six times (three in each direction) which is equal to:

6×22 milliseconds=132 milliseconds

Figure 3:
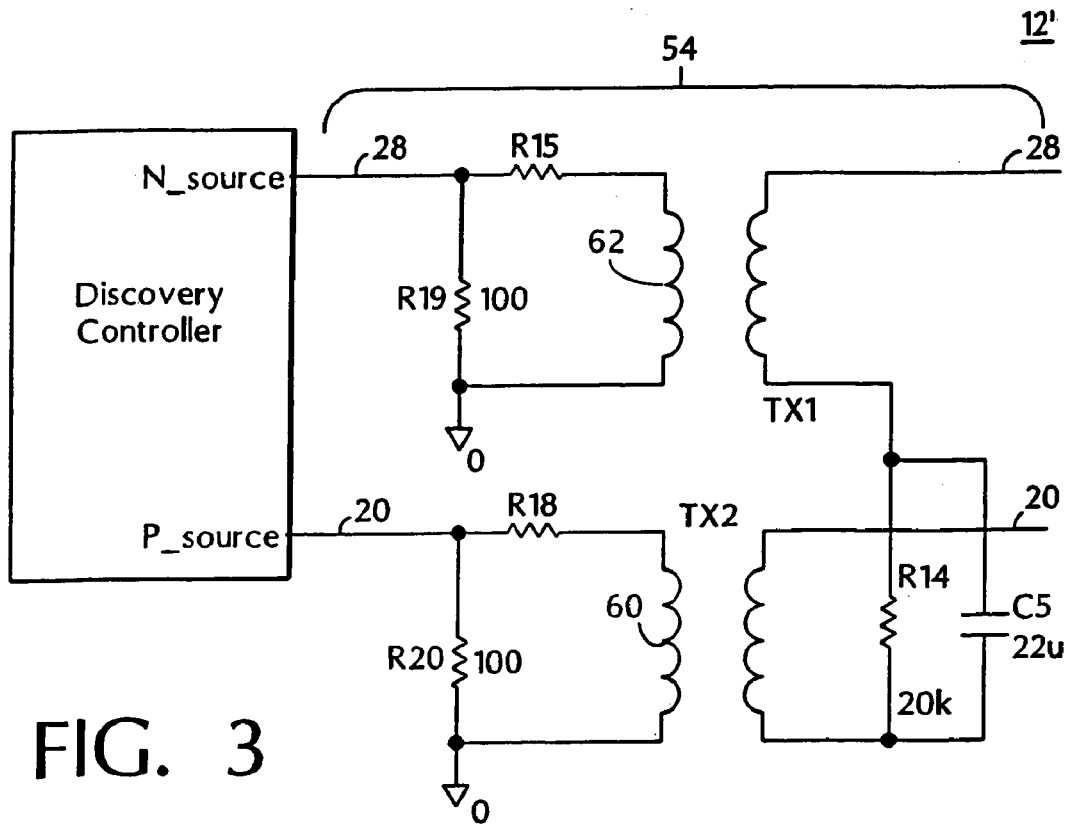
FIG. 3 shows a driver/receiver region of a diode discovery circuit.

Referring to FIG. 3, an alternate embodiment of a diode discovery process device 12' is shown. The device 12' has the driver/receiver region 54 including a transformer TX2 60 to couple the driver line 20 and a transformer TX1 62 to couple to the receiver line 28. The transformers are used in place of the π networks of FIG. 1. Coupling the driver line 20 and the receiver line 28 to the device 12' by transformers 60 and 62 meet isolation criteria as referenced under IEEE 802.3af.

Figure 4:
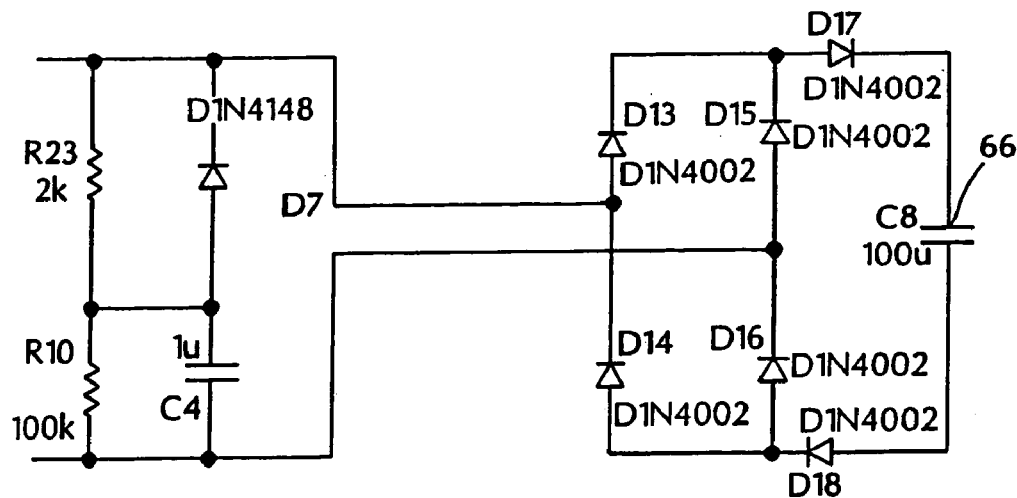
FIG. 4 shows a diode detector region and a diode bridge region of a diode discovery circuit.

Referring to FIG. 4, the diode detector region 56 (of FIG. 1) now includes AC coupling. Thus, the diode detector region 56 is tolerant of any polarity of power supply and of all standard cables found in compliant cable plants.

The MOSFETs 36 and 38 (of FIG. 1) are replaced by a diode bridge, comprised of diodes D13–D18. Any suitable diode type can be used. One type is a JEDEC reference type 1N 4002. By replacing the MOSFETs 36 and 38 with the diode bridge, power supply polarity is corrected for connection to the DTE power supply, provides an increased voltage drop to ensure that the discovery pulses never reach the DTE power supply, and allows for the possibility of ORing individual channels to provide more power.

Figure 5:
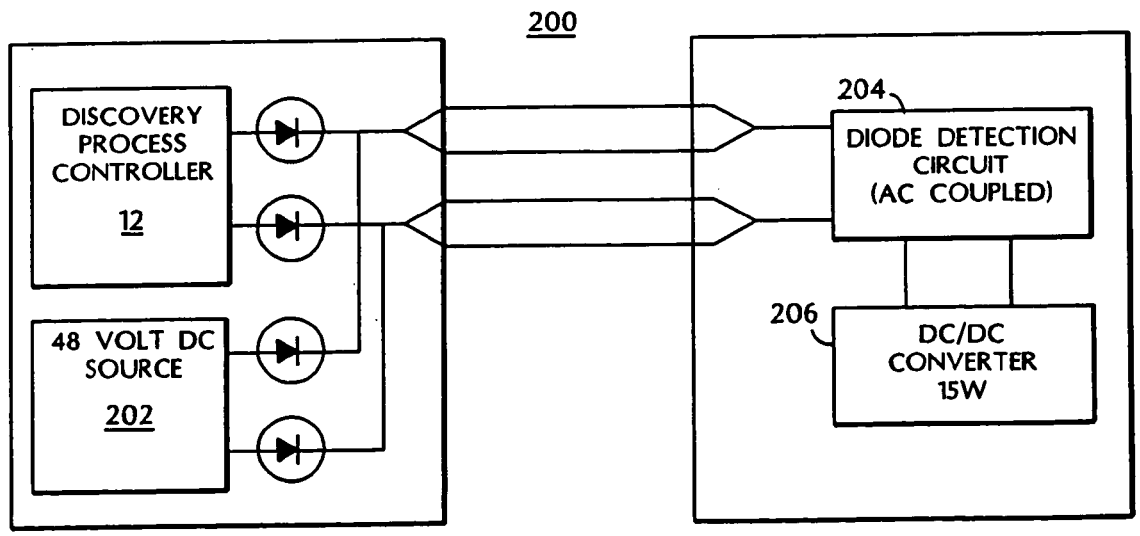
FIG. 5 shows a second diode discovery process circuit.

Referring to FIG. 5, a discovery process circuit 200 incorporating the modifications described with reference to FIG. 3 or 4 above includes the discovery process device 12 and DC voltage source 202. The circuit 200 also includes a diode detection circuit 204 and a DC/DC converter 206 that converts the 48 volt power supply voltage from the voltage source 202 into a lower DC voltage for use by the DTE (not shown).

Figure 6:
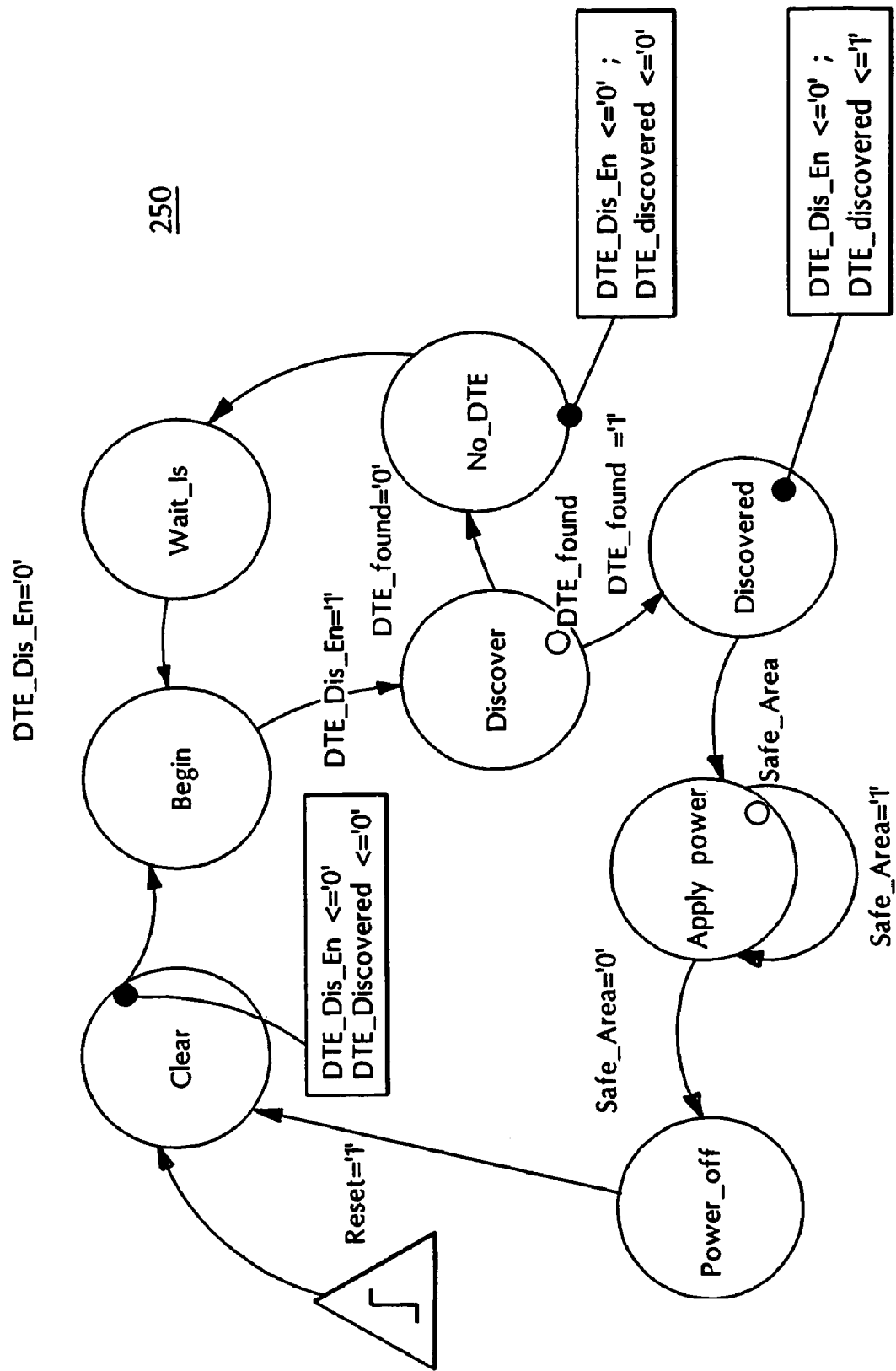
FIG. 6 shows a state diagram of the diode discovery process circuit of FIG. 5.

Referring now to FIG. 6, a state diagram 250 illustrates a top-level behavior (i.e., execution states) of the DTE discovery device 12 in the circuit 200. The state diagram 250 shows the interaction between a managing system device (not shown), the discovery process controller 12 and a fault management controller (not shown). System control is achieved via the "DTE_Dis_En" signal and status is reported via the "DTE_Discovered" signal. These signals can be hardware pins or register bits depending on an implementation chosen. The Discover state is where the diode discovery process 100 resides.

Figure 7:
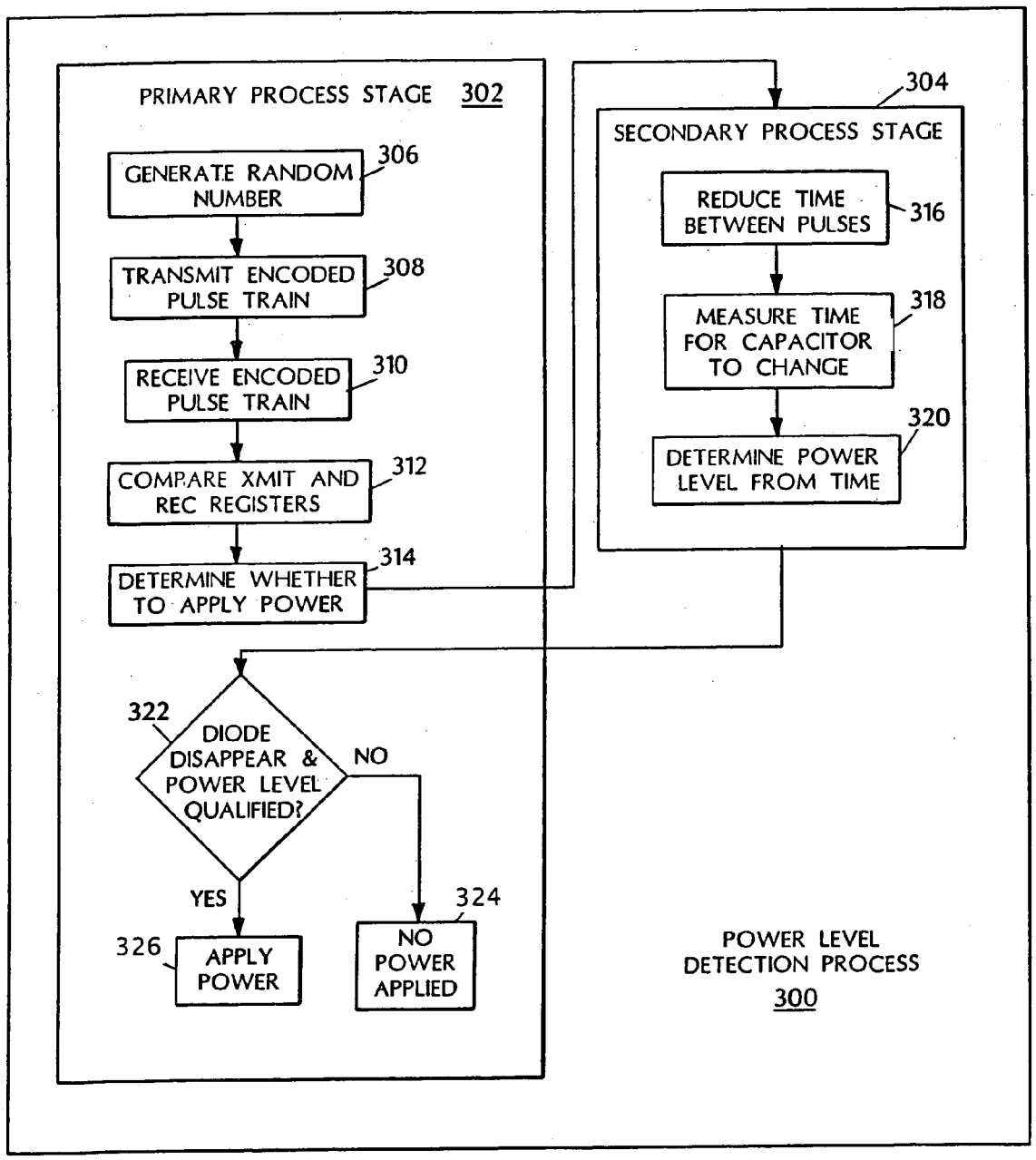
FIG. 7 shows a diode discovery power detection process.

Referring to FIG. 7, a power level detection process 300 is shown. The power level detection process 300 is integrated into the diode discovery process 100. The process 300 includes a primary process stage 302 and a secondary process stage 304. The primary process stage 302 focuses on discovering a diode while the secondary process stage 304 charges capacitor 66 (of FIG. 4), thus appearing to make the discovered diode in the primary stage 302 disappear. Secondary process stage 304 measures the time it takes to charge the capacitor 66 to determine the power level.

Primary process stage 302 generates (306) a pseudo random 11-bit word encoded as a pulse train, which sends a different word each time it is transmitted. The direction of the pulse train is changed each alternate transmit cycle and the process 302 is repeated three times. The primary process stage 302 transmits (308) the encoded pulse train and receives (310) the encoded pulse train. The primary stage process 302 compares (312) the contents of the receive register 52 and transmit register 50 and determines (314) whether to apply power in the secondary stage process 304.

The secondary process stage 304 reduces (316) the time between pulses thus allowing the capacitor no time to discharge naturally. The capacitor builds up a charge and appears to make the diode conduction path disappear. The secondary process stage 304 measures (318) the time taken for the capacitor to charge and determines (320) the power level from the time.

Having determined the power level required, process 300 returns control to the primary stage process 302. If the diode was seen to disappear and a power level has been qualified (322) the primary process stage 302 applies (326) power of the determined power level. If the diode did not disappear or no valid power level could be determined the primary process stage 302 does not apply power (324).

A number of embodiments of the invention have been described. Nevertheless, it will be understood that various modifications may be made without departing from the spirit and scope of the invention. Accordingly, other embodiments are within the scope of the following claims.

What is claimed is:

1. A method for discovering a power level in a diode discovery circuit comprising:
   transmitting a pulse signal from a diode discovery device on a first line;
   receiving the pulse signal in the diode discovery device on a second line;
   measuring a time to charge a capacitor in response to applying power to determine the power level; and
   applying power in response to comparing the transmitted pulse signal to the received pulse signal and to measuring the time.

2. The method of claim 1 in which the pulse signal includes a pseudo random generated 11-bit word.

3. The method of claim 2 in which the pseudo random generated 11-bit word is generated by a recursive linear function.

4. The method of claim 3 in which the recursive linear function is $X(n)=X[n-11]+X[n-9]$ (modulo 2).

5. The method of claim 2 in which the pseudo random generated 11-bit word is seeded by a port number of the diode discovery device.

6. The method of claim 1 further comprising repeating the transmitting and receiving.

7. A computer program product residing on a computer readable medium having instructions stored thereon which, when executed by the processor, cause the processor to:
   transmit a pulse signal from a diode discovery device on a first line;
   receive the pulse signal in the diode discovery device on a second line;
   measure a time to charge a capacitor in response to applying power to determine the power level; and
   apply power in response to comparing the transmitted pulse signal to the received pulse signal and to the measured time.

8. The computer program product of claim 7 in which the pulse signal includes pseudo random generated 11-bit word.

9. The computer program product of claim 8 in which the pseudo random generated 11-bit word is generated by a recursive linear function.

10. The computer program product of claim 9 in which the recursive linear function is $X(n)=X[n-11]+X[n-9]$ (modulo 2).

11. The computer program product of claim 8 in which the pseudo random generated 11-bit word is seeded by a port number of the diode discovery device.

12. A diode discovery system comprising:
    a diode discovery process controller to:
    transmit a pulse signal from the controller on a first line;
    receive the pulse signal in the controller on a second line;
    measure a time to charge a capacitor in a diode detection circuit in response to applying power to determine the power level;
    apply power in response to comparing the transmitted pulse signal to the received pulse signal and to the measured time;
    a voltage source connected to the controller; and
    a power converter linked to the diode detection circuit.

13. The system of claim 12 in which the pulse signal includes pseudo random generated 11-bit word.

14. The system of claim 13 in which the pseudo random generated 11-bit word is generated by a recursive linear function.

15. The system of claim 14 in which the recursive linear function is $X(n)=X[n-11]+X[n-9]$ (modulo 2).

16. The system of claim 13 in which the pseudo random generated 11-bit word is seeded by a port number of the diode discovery device.

17. The system of claim 12 further comprising means for repeating the pulse signal.

* * * * *